(12) United States Patent
Qin et al.

(10) Patent No.: US 10,784,968 B2
(45) Date of Patent: Sep. 22, 2020

(54) OPTICAL MODULE

(71) Applicant: Hisense Broadband Multimedia Technologies Co., Ltd., Qingdao, Shandong (CN)

(72) Inventors: Shixuan Qin, Shandong (CN); Rui Huang, Shandong (CN); Dengshan Xue, Shandong (CN); Ming Li, Shandong (CN)

(73) Assignee: HISENSE BROADBAND MULTIMEDIA TECHNOLOGIES CO., LTD., Qingdao (CN)

(*) Notice: Subject to any disclaimer, the term of this patent is extended or adjusted under 35 U.S.C. 154(b) by 0 days.

(21) Appl. No.: 16/585,787

(22) Filed: Sep. 27, 2019

(65) Prior Publication Data
US 2020/0145113 A1 May 7, 2020

Related U.S. Application Data

(63) Continuation of application No. PCT/CN2019/103025, filed on Aug. 28, 2019.

(30) Foreign Application Priority Data

Nov. 6, 2018 (CN) .......................... 2018 1 1314126

(51) Int. Cl.
H04B 10/69 (2013.01)
G02B 6/42 (2006.01)

(52) U.S. Cl.
CPC ........... *H04B 10/691* (2013.01); *G02B 6/428* (2013.01); *G02B 6/4278* (2013.01)

(58) Field of Classification Search
CPC ..... H04B 10/691; G02B 6/4278; G02B 6/428
See application file for complete search history.

(56) References Cited

U.S. PATENT DOCUMENTS

| 2006/0157646 | A1 | 7/2006 | Uchida et al. |
| 2014/0361151 | A1 | 12/2014 | Nomura |
| 2019/0237934 | A1* | 8/2019 | Adachi .................. H01S 5/042 |

FOREIGN PATENT DOCUMENTS

| CN | 101672872 A | 3/2010 |
| CN | 201732102 U | 2/2011 |

(Continued)

OTHER PUBLICATIONS

First Office Action for corresponding CN Application No. 201811314126.0, dated Nov. 4, 2019, 7 pages Chinese language and 7 pages English translation (machine).

(Continued)

*Primary Examiner* — Mina M Shalaby
(74) *Attorney, Agent, or Firm* — Brinks Gilson & Lione

(57) ABSTRACT

The present disclosure describes an optical device, a system including an optical receiver, and a system including an optical module. The optical device includes an Avalanche Photodiode (APD), a circuit board, a boost circuit disposed on the circuit board, a processor disposed on the circuit board and configured to control an output voltage of the boost circuit, and a probe point disposed on the circuit board. The boost circuit includes a control terminal electrically connecting to the processor. The boost circuit also includes an output terminal electrically connecting to the APD and the probe point respectively.

17 Claims, 4 Drawing Sheets

(56) References Cited

FOREIGN PATENT DOCUMENTS

| CN | 102122187 A | * | 7/2011 |
| CN | 102122187 A | | 7/2011 |
| CN | 103875181 A | | 6/2014 |
| CN | 107196505 A | | 9/2017 |
| CN | 108551360 A | | 9/2018 |
| CN | 109375691 A | | 2/2019 |
| JP | 2016-163291 A | | 9/2016 |

OTHER PUBLICATIONS

International Search Report for corresponding PCT Application No. PCT/CN2019/103025, dated Nov. 12, 2019, WIPO, 4 pages, Chinese language.

* cited by examiner

OPTICAL MODULE

CROSS REFERENCE TO RELATED APPLICATIONS

This application is a continuation application of International PCT Patent Application No. PCT/CN2019/103025 filed on Aug. 28, 2019, which claims priority to Chinese Patent Application No. 201811314126.0 filed on Nov. 6, 2018, both of which are incorporated herein by reference in their entireties.

TECHNICAL FIELD

The present disclosure relates to optical fiber communication technologies and in particular to an optical module.

BACKGROUND

An Avalanche Photodiode (APD) is a common light receiving device in an optical module. The APD forms an optical current after absorbing incident light. If a reverse bias voltage is increased, the optical current of the APD will be increased exponentially, so that a better reception sensitivity is achieved.

SUMMARY

The present disclosure describes an embodiment of an optical device. The optical device includes an Avalanche Photodiode (APD), a circuit board, a boost circuit disposed on the circuit board, a processor disposed on the circuit board and configured to control an output voltage of the boost circuit, and a probe point disposed on the circuit board. The boost circuit comprises a control terminal electrically connecting to the processor. The boost circuit also comprises an output terminal electrically connecting to the APD and the probe point respectively.

The present disclosure describes an embodiment of a system including an optical receiver. The optical receiver includes an Avalanche Photodiode (APD), a circuit board, a boost circuit disposed on the circuit board, a processor disposed on the circuit board and configured to control an output voltage of the boost circuit, and a probe point disposed on the circuit board. The boost circuit comprises a control terminal electrically connecting to the processor. The boost circuit also comprises an output terminal electrically connecting to the APD and the probe point respectively.

The present disclosure describes an embodiment of a system including an optical module. The optical module includes an Avalanche Photodiode (APD), a circuit board, a boost circuit disposed on the circuit board, a processor disposed on the circuit board and configured to control an output voltage of the boost circuit, and a probe point disposed on the circuit board. The boost circuit comprises a control terminal electrically connecting to the processor. The boost circuit also comprises an output terminal electrically connecting to the APD and the probe point respectively.

The above general descriptions and subsequent detailed descriptions are merely illustrative and explanatory and thus will not be limiting of the present disclosure.

BRIEF DESCRIPTION OF THE DRAWINGS

The accompanying drawings, which are incorporated in and constitute part of the present description, illustrate examples consistent with the present disclosure and serve to explain the principles of the present disclosure together with the descriptions.

DETAILED DESCRIPTION OF THE EMBODIMENTS

Figure 1:
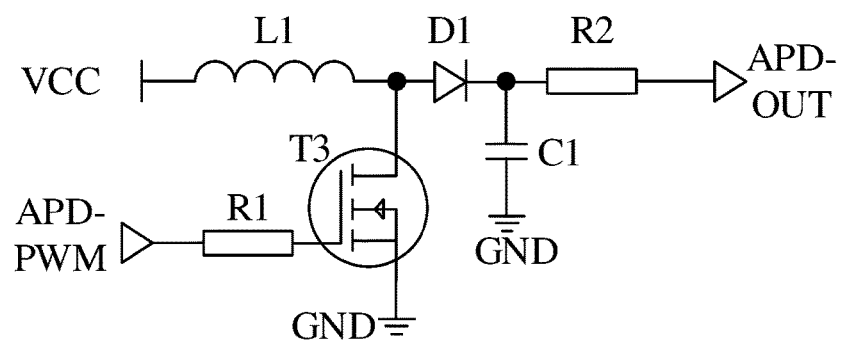
FIG. 1 is a diagram illustrating a boost circuit according to some approaches.

Illustrative embodiments will be described in detail herein with the examples thereof expressed in the drawings. When the following descriptions involve the drawings, like numerals in different drawings represent like or similar elements unless stated otherwise. The implementations described in the following illustrative embodiments do not represent all implementations consistent with the present disclosure. On the contrary, they are examples of an apparatus and a method consistent with some aspects of the present disclosure described in detail in the appended claims.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

An Avalanche Photodiode (APD) is a common light receiving device in an optical module. The APD forms an optical current after absorbing incident light. If a reverse bias voltage is increased, the optical current formed by the APD will be increased exponentially, so that reception sensitivity becomes better. Since a power source of the optical module has a voltage of only 3.3V, a boost circuit is usually disposed in the optical module to increase the voltage of the power source from 3.3V to dozens of volts and then take the voltage as the reverse bias voltage of the APD.

Generally, the optical module is classified into the following categories: an optical transmitter, an optical receiver, and an optical transceiver. The optical transmitter converts an electrical signal into an optical signal and transmits it through an optical fiber. The optical receiver converts a received optical signal into an electrical signal. The optical transceiver can convert an electrical signal into an optical signal and convert an electrical signal into an optical signal. In some embodiments, the light module includes an avalanche photodiode and a circuit board. In other embodiments, the optical transceiver includes an avalanche photodiode and a circuit board. Optionally, the receiver includes an avalanche photodiode and a circuit board. The optical module including the avalanche photodiode and the circuit board is taken for example in the following description.

FIG. 1 is a schematic diagram illustrating a boost circuit. As shown in FIG. 1, the boost circuit works based on the following working principle: when a control signal, APD-Pulse-Width Modulation (APD-PWM), is of low voltage, a switching Metal Oxide Semiconductor (MOS) transistor T3 is turned off. When the switching MOS transistor T3 is turned off, a current flows from a power source VCC sequentially through an inductor L1, a diode D1 to a capacitor C1, thereby supplying power to the capacitor C1 by the power source VCC. At the same time, the current further flows through a resistor R2 and an output APD-OUT to the APD, that is, the capacitor C1 and the power source VCC supply a reverse bias voltage to the APD. Here, the APD-PWM having a low voltage may refer to that the voltage of the APD-PWM is lower than a turn-on voltage or a threshold voltage of the transistor T3. In one implementation, the turn-on voltage of the transistor may be between 1V and 2V, inclusive. In another implementation, the turn-on voltage of the transistor may be between 2V and 5V, inclusive.

When the control signal APD-PWM is of high voltage, the switching MOS transistor T3 is turned on. When the switching MOS transistor T3 is turned on, the current flows from the power source VCC sequentially through the inductor L1, the switching MOS transistor T3 to a ground GND. Due to a unidirectional conductivity of the diode D1, the capacitor C1 supplies the reverse bias voltage to the APD through the resistor R2 at this time. Here, the APD-PWM having a high voltage may refer to that the voltage of the APD-PWM is equal to or higher than a turn-on voltage or a threshold voltage of the transistor T3. In one implementation, the turn-on voltage of the transistor may be between 1V and 2V, inclusive. In another implementation, the turn-on voltage of the transistor may be between 2V and 5V, inclusive.

In some scenarios, because an optimal working voltage of the APD is not fixed due to process limitations, a voltage at the voltage output APD-OUT of the boost circuit is detected to ensure the voltage is matched with the optical working voltage of the APD. In addition, the boost circuit is constructed with devices. The devices differ from each other, and therefore the boost circuits constructed with different devices will output different output voltages. In this case, the voltage at the APD-OUT is further finely adjusted. However, technicians often detect the voltage at the voltage output APD-OUT directly by use of a probe or a wire. A given voltage will be applied to circuits including the boost circuit when the voltage at the voltage output APD-OUT is detected. In this case, some voltage surges will be generated and thus the detected voltage values become inaccurate, which further affects the voltage at the voltage output APD-OUT and the sensitivity of the APD.

Figure 2:
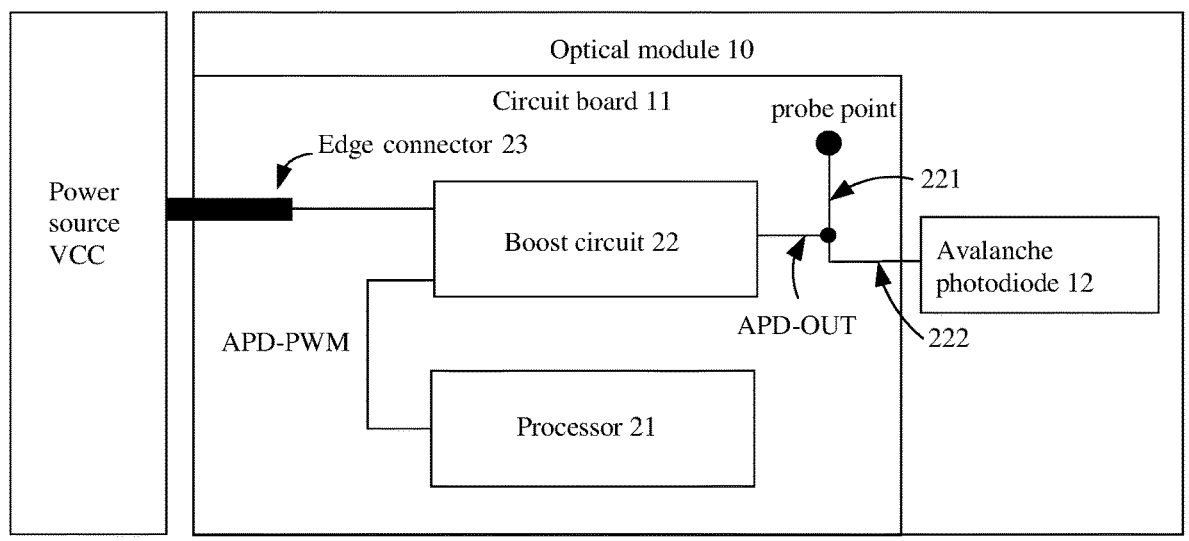
FIG. 2 is a block diagram illustrating an optical module according to some embodiments of the present disclosure.

In view of this, the present disclosure provides an optical module. As shown in FIG. 2, the optical module 10 includes a circuit board 11, and an Avalanche Photodiode (APD) 12. A processor 21, a probe point and an edge connector 23 are disposed on the circuit board 11. In one implementation, the edge connector 23 may be one or more connecting finger. The circuit board 11 includes a boost circuit 22. A voltage input of the boost circuit 22 is connected with a power supply pin of the edge connector 23. The power supply pin is pluggably connected with the power source VCC.

The processor 21 is connected with a control terminal of the boost circuit 22. In this way, the processor 21 inputs a control signal APD-PWM to the control terminal of the boost circuit 22 to control an output voltage at a voltage output of the boost circuit. In other words, the processor controls the boost circuit to output an output voltage higher than a voltage supplied by the power source. The output voltage is related to the control signal.

The voltage output APD-OUT of the boost circuit 22 is connected with the APD 12 and the probe point respectively.

The probe point according to some embodiments of the present disclosure is presented on the circuit board 11 in at least one of the following manners: a welding sheet, a wire and an edge connector. In this case, technicians obtain the voltage at the voltage output APD-OUT by making the probe directly in contact with the probe point.

Figure 3:
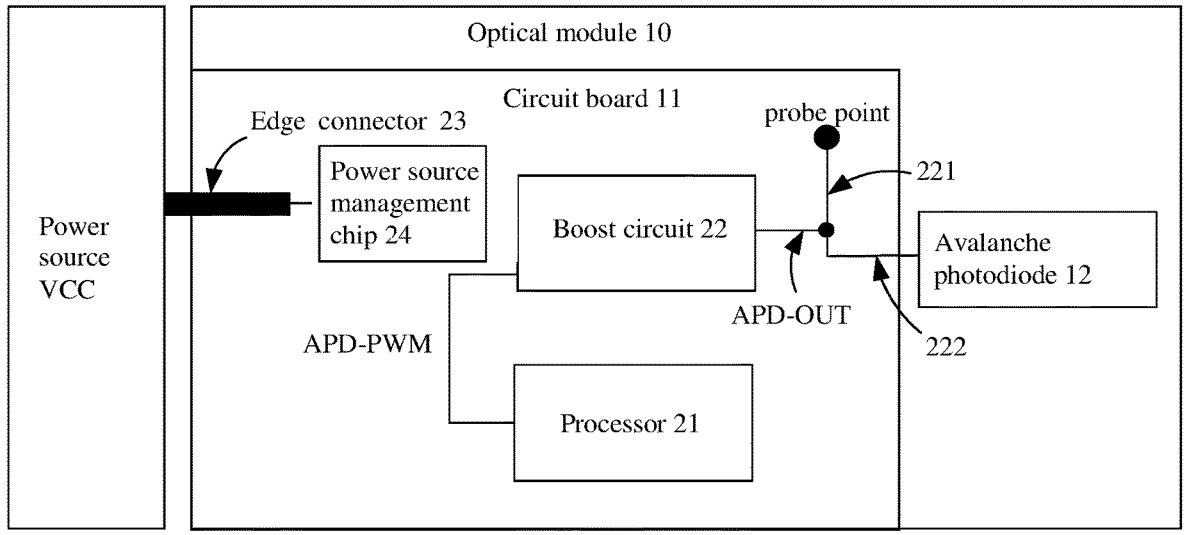
FIG. 3 is a block diagram illustrating another optical module according to some embodiments of the present disclosure.

FIG. 2 only illustrates an edge connector relating to the power source of the boost circuit 22. Technicians may further adjust the functions and the number of the edge connectors according to a specific scenario, which is not limited herein. In some examples, one power source management chip is disposed between the edge connector and the boost circuit 22. As shown in FIG. 3, the power source management chip 24 is configured to adjust a voltage and/or a current input by the power source VCC so that the requirements of input voltage, current and power of the boost circuit 22 are satisfied. Further, technicians select the power source management chip 24 according to specific scenarios, which is not limited herein.

So far, in the present disclosure, the edge connector on the circuit board is connected with the power source and the voltage input of the boost circuit is connected with the edge connector. In this case, the power source supplies voltage to the boost circuit. The processor on the circuit board is connected with the control terminal of the boost circuit so that the processor controls, by inputting a control signal to the control terminal, the boost circuit to output an output voltage higher than the voltage supplied by the power source. The amount of the output voltage is related to the control signal. Further, the voltage output of the boost circuit is connected with the APD and the probe point respectively and therefore the voltage on the probe point is the output voltage. In this case, technicians detect the output voltage on the probe point conveniently, thereby reducing the detection difficulty and improving the accuracy of detecting the output voltage at the voltage output of the boost circuit.

In some embodiments, the voltage output APU-OUT of the boost circuit 22 is connected with the APD and the probe point through two wires respectively. In FIG. 2, the voltage output APU-OUT is connected with the probe point through a first wire 221 and connected with the APD 12 through a second wire 222. In the examples, the probe point is connected through the wire and therefore the probe point is disposed at an idle position of the circuit board 11 for convenient detection by a user.

Figure 4:
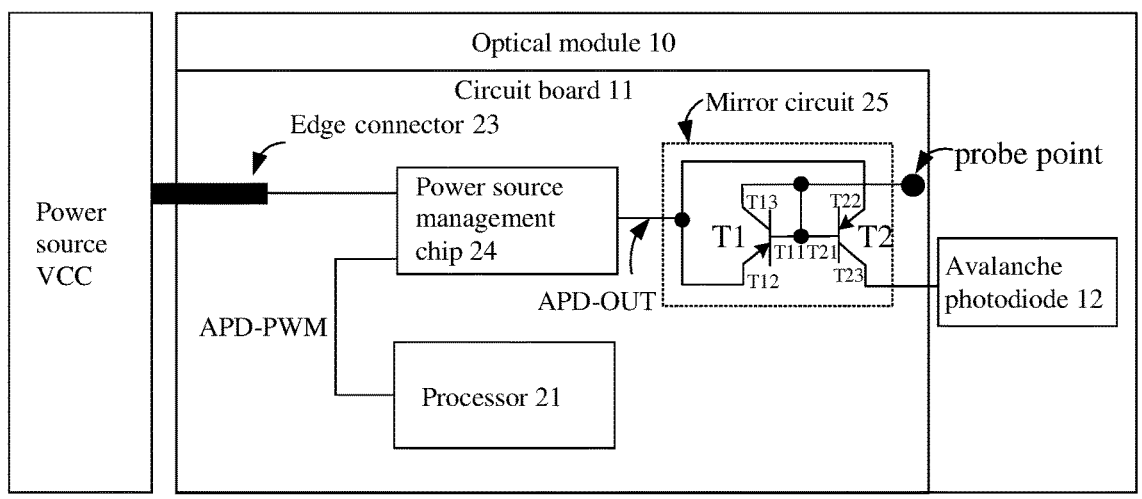
FIG. 4 is a block diagram illustrating still another optical module according to some embodiments of the present disclosure.

In some embodiments, the voltage output APU-OUT of the boost circuit 22 is connected with the APD 12 and the probe point respectively through a mirror circuit. As shown in FIG. 4, the mirror circuit 25 includes one input and two outputs, where the input is connected with the voltage output APD-OUT of the boost circuit 22, one output is connected with the probe point and the other output is connected with the APD 12.

Still with reference to FIG. 4, the mirror circuit 25 includes at least a first transistor T1 and a second transistor T2. A second end T12 of the first transistor T1 is connected with the voltage output APD-OUT of the boost circuit 22, and a first end T11 and a third end T13 of the first transistor T1 are connected with the probe point. A first end T21 of the second transistor T2 is connected with the first end T11 and the third end T13 of the first transistor T1 and the probe point respectively and a second end T22 of the second transistor T2 is connected with the voltage output APD-OUT of the boost circuit 22 and a third end T23 of the second transistor T2 is connected with the APD 12.

In some examples, to ensure the third end of the first transistor T1 and the third end of the second transistor T2 are the same in voltage, the first transistor T1 and the second transistor T2 are implemented by using elements of the same model or the same process. In some examples, the first transistor T1 and the second transistor T2 are PNP type triodes. In some examples, the first transistor T1 and the second transistor T2 are MOS transistors.

Still with reference to FIG. 4, PNP type triodes are taken as the first transistor T1 and the second transistor T2 and the two devices both work in a linear region. The mirror circuit 25 works based on the following principle: the voltage at the voltage output APD-OUT of the boost circuit 22 is a first voltage higher than the voltage supplied by the power source VCC or a second voltage lower than the voltage supplied by the power source VCC. The first voltage is matched with the optimal working voltage of the APD 12. The optimal working voltage refers to a reverse bias voltage corresponding to the highest sensitivity of the APD 12. In an ideal case, the voltage at the voltage output APD-OUT is equal to the optimal working voltage of the APD.

When the voltage at the voltage output APD-OUT of the boost circuit 22 is the first voltage, the voltage at the second end T12 (i.e. an emitter electrode) of the first transistor T1 is greater than the voltage at the first end T11 (i.e. a base electrode), that is, the first transistor T1 is subjected to Vbe reverse bias. In one implementation, "Vbe" may refer to a voltage between a base terminal and an emitter terminal of a transistor. In another implementation, "Vbe" may refer to a voltage of a base-emitter junction of a transistor. In this case, the first transistor T1 is turned on and the third end T13 (i.e. the collector electrode) of the first transistor T1 approximately outputs the voltage at the emitter electrode T12. Here, "approximately" may refer to about the same value, but not exactly the same value. Here, in the present disclosure, "about" a value may refer to a range between 90% and 110% of the value, inclusive.

The voltage at the second end T22 (i.e. an emitter electrode) of the second transistor T2 is greater than the voltage at the first end T21 (i.e. a base electrode), that is, the second transistor T2 is subjected to Vbe reverse bias. In this case, the second transistor T2 is turned on and the third end T23 (i.e. a collector electrode) of the second transistor T2 approximately outputs the voltage at the emitter electrode T22.

Still with reference to FIG. 4, since the collector electrode T13 of the first transistor T1 is connected with the probe point and the emitter electrode T12 of the first transistor T1 is connected with the voltage output APD-OUT of the boost circuit 22, the voltage at the probe point is approximate to the first voltage supplied by the voltage output APD-OUT of the boost circuit 22 with the difference being a voltage (or a "PN junction voltage") occupied by a PN junction between the emitter electrode T12 and the collector electrode T13. The PN junction voltage may be much smaller than a voltage of the power source VCC. In one implementation, the PN junction voltage may be less than 1 volt and the power source VCC may have a voltage of dozens of Volts. For example, a PN junction voltage may be about 0.4 volt for a germanium transistor, and may be about 0.7 volt for a silicon transistor. Thus, in a case of dozens of volts of voltage, the voltage occupied by the PN junction is negligible. That is, the voltage at the probe point and the first voltage supplied by the voltage output APD-OUT are deemed as about the same.

Still with reference to FIG. 4, since the collector electrode T23 of the second transistor T2 is connected with the input of the APD 12 and the emitter electrode T22 of the second transistor T2 is connected with the voltage output APD-OUT of the boost circuit 22, the input voltage of the APD 12 is approximate to the first voltage supplied by the voltage output of the boost circuit 22 with the difference being a voltage occupied by a PN junction between the emitter electrode T22 and the collector electrode T23 (less than 1V, for example, 0.4V of a germanium transistor). In a case of dozens of volts of voltage, the voltage occupied by the PN junction is negligible. That is, the input voltage of the APD 12 and the first voltage supplied by the voltage output APD-OUT are deemed as the same.

Since the first transistor T1 and the second transistor T2 are implemented by using elements of the same model or the same process, the voltages occupied by the PN junctions are the same. In other words, the voltage at the probe point and the input voltage of the APD 12 are the same, that is, the voltage at the probe point represents the input voltage of the APD 12 and the output voltage of the boost circuit 22.

In some examples, in a case that the second transistor T2 is turned on, when the voltage at the probe point is detected with the probe, a voltage to the probe point is applied, and a voltage at the base electrode T21 of the second transistor T2 is increased. In this case, the voltage of the collector electrode T23 of the second transistor T2 will change synchronously, that is, the voltage at the probe point and the input voltage of the APD 12 will change synchronously. In this way, the voltage at the voltage output APD-OUT is free from the impact of a voltage fluctuation at the probe point.

In some embodiments, the mirror circuit 25 further includes a first current-limiting circuit and a second current-limiting circuit. The first current-limiting circuit is connected in series between the second end T12 of the first transistor T1 and the voltage output APD-OUT. In one implementation, the voltage output APD-OUT may be an output terminal of the boost circuit 22, which may also connect to an input of the mirror circuit.

Figure 5:
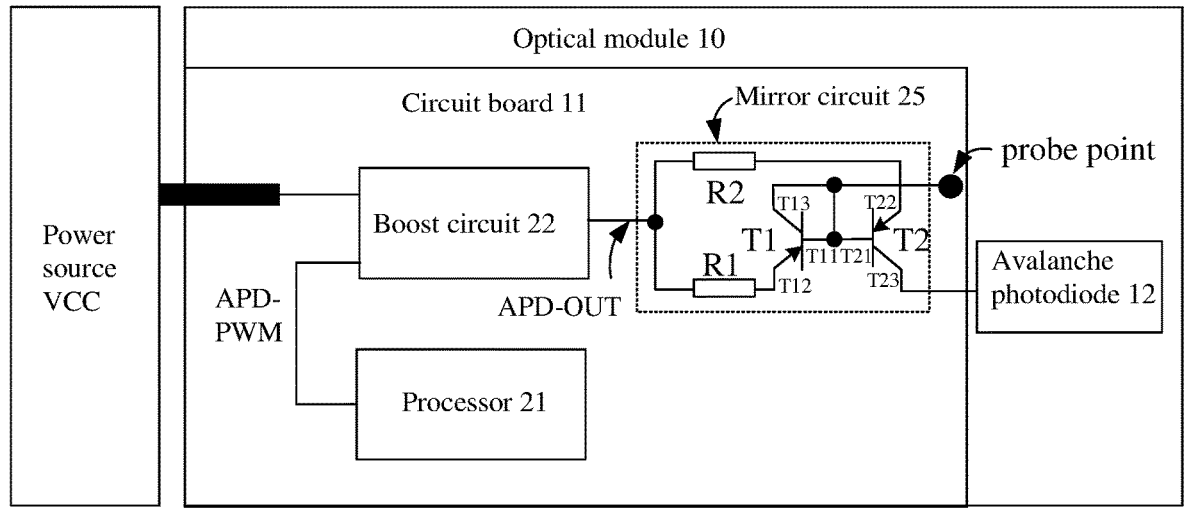
FIG. 5 is a block diagram illustrating yet another optical module according to some embodiments of the present disclosure.

The second current-limiting circuit is connected in series between the second end T22 of the second transistor T2 and the voltage output APD-OUT. In this case, the currents of branch circuits where the first current-limiting circuit and the second current-limiting circuit are located are adjusted respectively by the first current-limiting circuit and the second current-limiting circuit in the embodiments. In some embodiments, the first current-limiting circuit and the second current-limiting circuit include at least one current-limiting resistor respectively. As shown in FIG. 5, the first current-limiting circuit includes a current-limiting resistor R1 and the second current-limiting circuit includes a current-limiting resistor R2.

In some examples, the mirror circuit 25 includes the first transistor T1 and the second transistor T2. In this case, the current-limiting resistor R1 and the current-limiting resistor R2 have the same resistance value.

Figure 6:
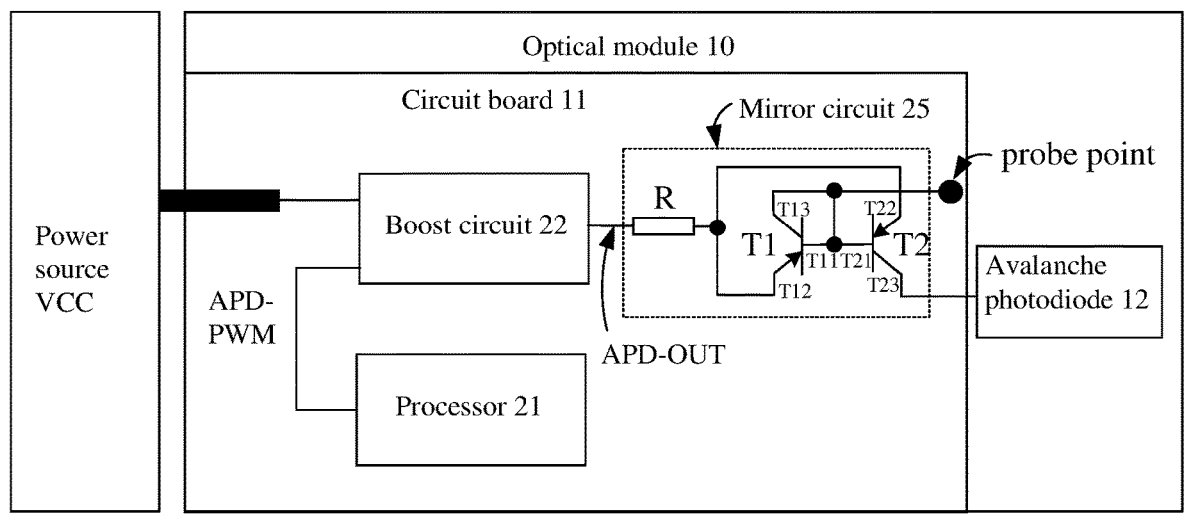
FIG. 6 is a block diagram illustrating yet another optical module according to some embodiments of the present disclosure.

In some embodiments, the mirror circuit 25 includes a third current-limiting circuit. As shown in FIG. 6, the third current-limiting circuit includes at least one current-limiting resistor R. The current-limiting resistor R is connected in series between the voltage output APD-OUT (i.e. the input of the mirror circuit) and both the second end T12 of the first transistor T1 and the second end T22 of the second transistor T2 to adjust a current input to the mirror circuit.

In some embodiments, the mirror circuit 25 includes the first current-limiting circuit and the second current-limiting circuit shown in FIG. 5 and the third current-limiting circuit shown in FIG. 6. The currents of the branch circuits where the first current-limiting circuit and the second current-limiting circuit are located are adjusted respectively by the first current-limiting circuit and the second current-limiting circuit and the current input to the mirror circuit is adjusted by the third current-limiting circuit.

Figure 7:
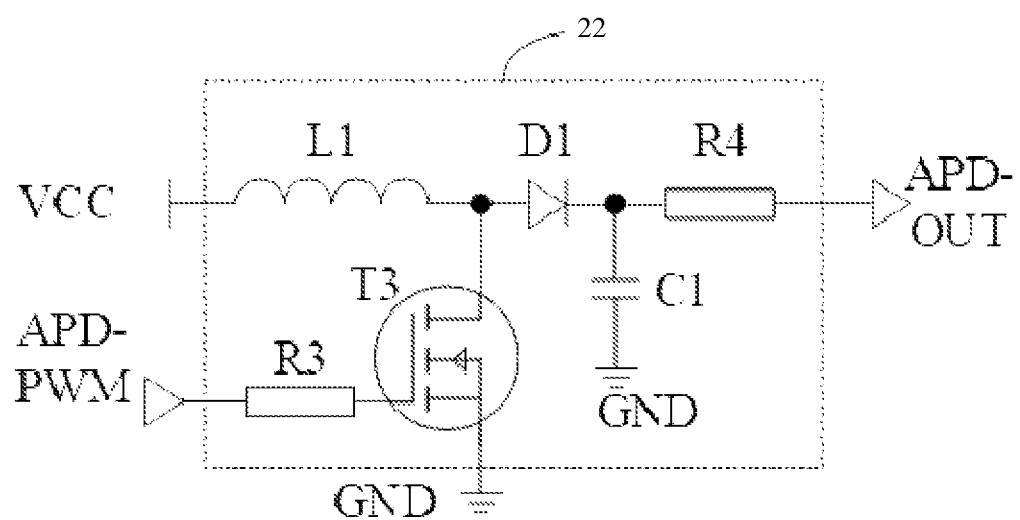
FIG. 7 is a diagram illustrating a boost circuit according to some embodiments of the present disclosure.

In some embodiments, as shown in FIG. 7, the boost circuit 22 includes a first inductor L1, a first diode D1, a first capacitor C1, a third resistor R3, a fourth resistor R4 and a field effect transistor T3.

A first end of the first inductor L1 is connected with the power source VCC. In some implementations, the first end of the first inductor L1 is connected with the power source VCC through an edge connector 23. A second end of the first inductor L1 is connected with an anode of the first diode D1. A cathode of the first diode D1 is connected with a first end of the fourth resistor R4. A second end of the fourth resistor R4 is connected with the output APD-OUT of the boost circuit 22. A first end of the first capacitor C1 is connected with the cathode of the first diode D1, and a second end of the first capacitor C1 is connected with the ground GND. A first end of the third resistor R3 is connected with a signal output of the processor and a second end of the third resistor R3 is connected with a first end of the field effect transistor T3. A second end of the field effect transistor T3 is connected with the second end of the first inductor L1 and a third end of the field effect transistor T3 is grounded.

Still with reference to FIG. 7, the working principle of the boost circuit 22 will be described below.

The signal output of the processor outputs a control signal APD-PWM. The control signal APD-PWM is, for example, the first voltage higher than the voltage supplied by the power source VCC or the second voltage lower than the voltage supplied by the power source VCC. Because the field effect transistor T3 is an N type field effect transistor, the first end of the field effect transistor T3 is turned on upon reception of the first voltage and turned off upon reception of the second voltage.

When the APD-PWM is the second voltage, the field effect transistor T3 is turned off. When the field effect transistor T3 is turned off, the current flows from the power source VCC sequentially through the first inductor L1, the first diode D1 to the first capacitor C1, that is, the power source VCC supplies power to the first capacitor C1. At the same time, the current further flows through the fourth resistor R4 and the voltage output APD-OUT to the APD 12. In this case, the first capacitor C1, the first inductor L1 and the power source VCC supply voltage to the APD 12. Thus, the voltage at the input of the APD 12 is the sum of the voltage of the first capacitor C1, the induction voltage of the first inductor L1 and the voltage of the power source VCC.

When the APD-PWM is the first voltage, the field effect transistor T3 is turned on. When the field effect transistor T3 is turned on, the current flows from the power source VCC sequentially through the inductor L1, the field effect transistor T3 to the ground GND, that is, the power source VCC does not supply power to the first capacitor C1. Due to the unidirectional conductivity of the first diode D1, the first capacitor C1 supplies voltage to the APD 12 through the fourth resistor R4 at this time and the voltage at the input of the APD 12 is the voltage of the first capacitor C1.

In some embodiments, the processor adjusts the voltage of the first capacitor C1 by adjusting a duty cycle of the output control signal APD-PWM, so that the voltage at the voltage output of the boost circuit 22 is adjusted. In an ideal case, the output voltage of the boost circuit is equal to the optimal working voltage of the APD. A reference may be made to related art for the manner of adjusting the duty cycle of the control signal, which will not be repeated herein.

In the descriptions of the present specification, terms such as "an example", "some examples", "illustrative examples", "embodiments", "some embodiments" or "some implementations" are intended to refer to that a specific feature, structure, material, or characteristic described in combination with an embodiment or an example are included in at least one embodiment or example of the present disclosure. In the present specification, the illustrative expressions of the above terms do not necessarily refer to the same embodiment or example. Further, specific feature, structure, material or characteristic described above may be combined in a proper way in one or more embodiments or examples.

The foregoing disclosure is merely illustrative of preferred examples of the present disclosure but not intended to limit the present disclosure, and any modifications, equivalent substitutions, adaptations thereof made within the spirit and principles of the disclosure shall fall within the scope of the present disclosure.

The invention claimed is:

1. An optical transceiver, comprising:
   an Avalanche Photodiode, APD;
   a circuit board, comprising a boost circuit;
   a processor, configured to control an output voltage of the boost circuit;
   a probe point, configured on the circuit board; and
   a mirror circuit on the circuit board, wherein an input of the mirror circuit is electrically connected with an output of the boost circuit, a first output of the mirror circuit is electrically connected with the input of the APD, and a second output of the mirror circuit is directly and electrically connected with the probe point, the first output of the mirror circuit having the same voltage as at the second output of the mirror circuit;
   wherein, a control terminal of the boost circuit is electrically connected with the processor, and an output terminal of the boost circuit is electrically connected with the APD and the probe point respectively.

2. The optical transceiver according to claim 1, wherein the mirror circuit comprises at least:

a first transistor, wherein a second end of the first transistor is electrically connected with the output of the boost circuit, and a first end of the first transistor is electrically connected with a third end of the first transistor; and
a second transistor, wherein a first end of the second transistor is electrically connected with the third end of the first transistor and the probe point respectively, a second end of the second transistor is electrically connected with the output of the boost circuit, and a third end of the second transistor is electrically connected with the APD.

3. The optical transceiver according to claim 2, wherein, the first transistor is a PNP type triode; and
the second transistor is a PNP type triode.

4. The optical transceiver according to claim 2, wherein the mirror circuit further comprises:
a first current-limiting circuit electrically connected between the second end of the first transistor and the input of the mirror circuit; and
a second current-limiting circuit electrically connected between the second end of the second transistor and the input of the mirror circuit.

5. The optical transceiver according to claim 4, wherein, the first current-limiting circuit comprises at least a first current-limiting resistor; and
the second current-limiting circuit comprises at least a second current-limiting resistor.

6. The optical transceiver according to claim 2, wherein the mirror circuit further comprises:
a third current-limiting circuit, electrically connected between the input of the mirror circuit and a connection point which is between the second end of the first transistor and the second end of the second transistor.

7. The optical transceiver according to claim 6, wherein the third current-limiting circuit comprises at least a third current-limiting resistor.

8. The optical transceiver according to claim 1, further the circuit board is configure with an edge connector, a power supply pin of the edge connector is electrically connected with the input of the boost circuit.

9. The optical transceiver according to claim 8, further comprising a power source management chip, wherein the input of the boost circuit is electrically connected with the power supply pin of the edge connector through the power source management chip.

10. The optical transceiver according to claim 1, wherein the boost circuit comprises:
a first resistor, wherein a first end of the first resistor is electrically connected with an output of the processor and a second end of the first resistor is electrically connected with a first end of a field effect transistor;
the field effect transistor, wherein a second end of the field effect transistor is electrically connected with a second end of a first inductor and a third end of the field effect transistor is grounded;
the first inductor, wherein a first end of the first inductor receives power supply and a second end of the first inductor is electrically connected with an anode of a first diode;
the first diode, wherein a cathode of the first diode is electrically connected with a first end of a second resistor and a first end of a first capacitor respectively;
the second resistor, wherein a second end of the second resistor is electrically connected with the output of the boost circuit; and the first capacitor, wherein a second end of the first capacitor is grounded.

11. An optical receiver, comprising:
an Avalanche Photodiode, APD;
a circuit board, comprising a boost circuit;
a processor, configured to control an output voltage of the boost circuit;
a probe point, configured on the circuit board; and
a mirror circuit on the circuit board, wherein an input of the mirror circuit is electrically connected with an output of the boost circuit, a first output of the mirror circuit is electrically connected with the input of the APD, and a second output of the mirror circuit is directly and electrically connected with the probe point, the first output of the mirror circuit having the same voltage as at the second output of the mirror circuit;
wherein, a control terminal of the boost circuit is electrically connected with the processor, and an output terminal of the boost circuit is electrically connected with the APD and the probe point respectively.

12. The optical receiver according to claim 11, wherein the mirror circuit comprises at least:
a first transistor, wherein a second end of the first transistor is electrically connected with the output of the boost circuit, and a first end of the first transistor is electrically connected with a third end of the first transistor; and
a second transistor, wherein a first end of the second transistor is electrically connected with the third end of the first transistor and the probe point respectively, a second end of the second transistor is electrically connected with the output of the boost circuit, and a third end of the second transistor is electrically connected with the APD.

13. The optical receiver according to claim 12, wherein the mirror circuit further comprises:
a first current-limiting circuit electrically connected between the second end of the first transistor and the input of the mirror circuit; and
a second current-limiting circuit electrically connected between the second end of the second transistor and the input of the mirror circuit.

14. The optical receiver according to claim 12, wherein the mirror circuit further comprises:
a third current-limiting circuit, electrically connected between the input of the mirror circuit and a connection point which is between the second end of the first transistor and the second end of the second transistor.

15. An optical module, comprising:
an Avalanche Photodiode, APD;
a circuit board, comprising a boost circuit;
a processor, configured to control an output voltage of the boost circuit;
a probe point, configured on the circuit board; and
a mirror circuit on the circuit board, wherein an input of the mirror circuit is electrically connected with an output of the boost circuit, a first output of the mirror circuit is electrically connected with the input of the APD, and a second output of the mirror circuit is directly and electrically connected with the probe point, the first output of the mirror circuit having the same voltage as at the second output of the mirror circuit;
wherein, a control terminal of the boost circuit is electrically connected with the processor, and an output terminal of the boost circuit is electrically connected with the APD and the probe point respectively.

16. The optical module according to claim 15, wherein the mirror circuit comprises at least:
  a first transistor, wherein a second end of the first transistor is electrically connected with the output of the boost circuit, and a first end of the first transistor is electrically connected with a third end of the first transistor; and
  a second transistor, wherein a first end of the second transistor is electrically connected with the third end of the first transistor and the probe point respectively, a second end of the second transistor is electrically connected with the output of the boost circuit, and a third end of the second transistor is electrically connected with the APD.

17. The optical module according to claim 16, wherein the mirror circuit further comprises:
  a first current-limiting circuit electrically connected between the second end of the first transistor and the input of the mirror circuit; and
  a second current-limiting circuit electrically connected between the second end of the second transistor and the input of the mirror circuit.

\* \* \* \* \*